United States Patent
Fay

(10) Patent No.: US 9,996,965 B1
(45) Date of Patent: Jun. 12, 2018

(54) TEMPLATE BASED TEXT AND GRAPHICS WITH DYNAMIC DURATION

(71) Applicant: Todor Fay, La Jolla, CA (US)

(72) Inventor: Todor Fay, La Jolla, CA (US)

(73) Assignee: NewBlue Inc., San Diego, CA (US)

( * ) Notice: Subject to any disclaimer, the term of this patent is extended or adjusted under 35 U.S.C. 154(b) by 27 days.

(21) Appl. No.: 15/372,844

(22) Filed: Dec. 8, 2016

(51) Int. Cl.
G06T 13/00 (2011.01)
G06T 13/80 (2011.01)
G06T 11/60 (2006.01)

(52) U.S. Cl.
CPC .............. *G06T 13/80* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2009/0156170 A1* | 6/2009 | Rossano | ................. | H04L 51/38 455/412.1 |
| 2010/0207950 A1* | 8/2010 | Zhao | ...................... | G06T 13/00 345/473 |
| 2012/0201518 A1* | 8/2012 | Singer | ............... | G06F 17/30058 386/279 |

* cited by examiner

*Primary Examiner* — Frank Chen
(74) *Attorney, Agent, or Firm* — Ronaldo Penaflor

(57) ABSTRACT

An automated animated title sequence mechanism including a system and methods for template based text and graphics that can render the animated title sequence where the duration of the sequence dynamically fits an arbitrary or predetermined timeline. The automated animated title sequence includes a title template document to store a complete description of an animated title sequence. The title template document is composed of a timeline, animated text and graphics, data and instructions for playback of the animated text and graphics over the course of the timeline.

3 Claims, 16 Drawing Sheets

FIG. 1

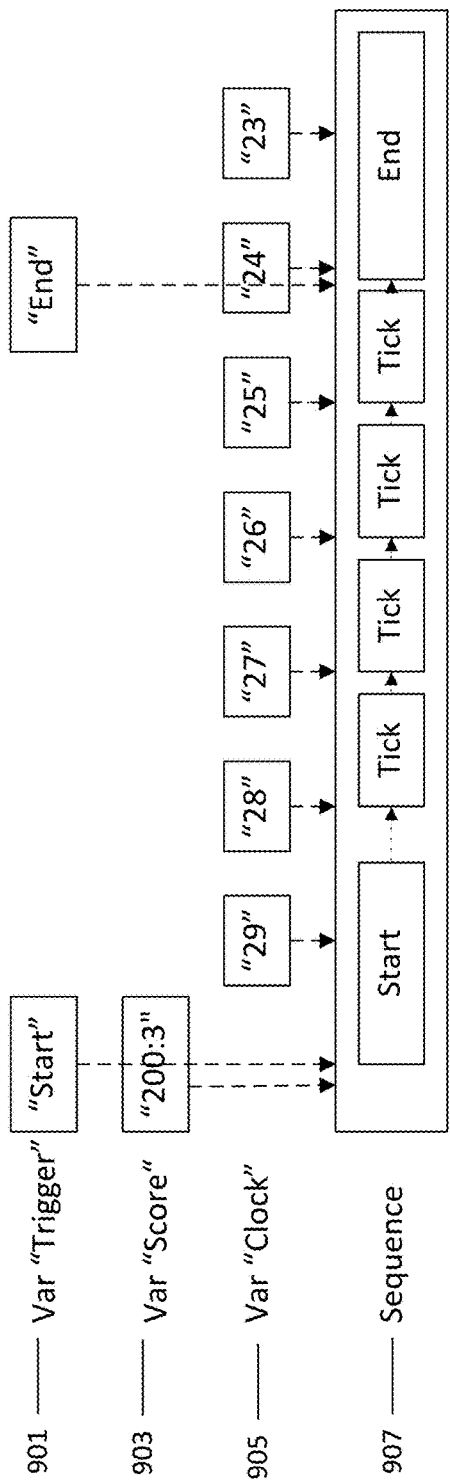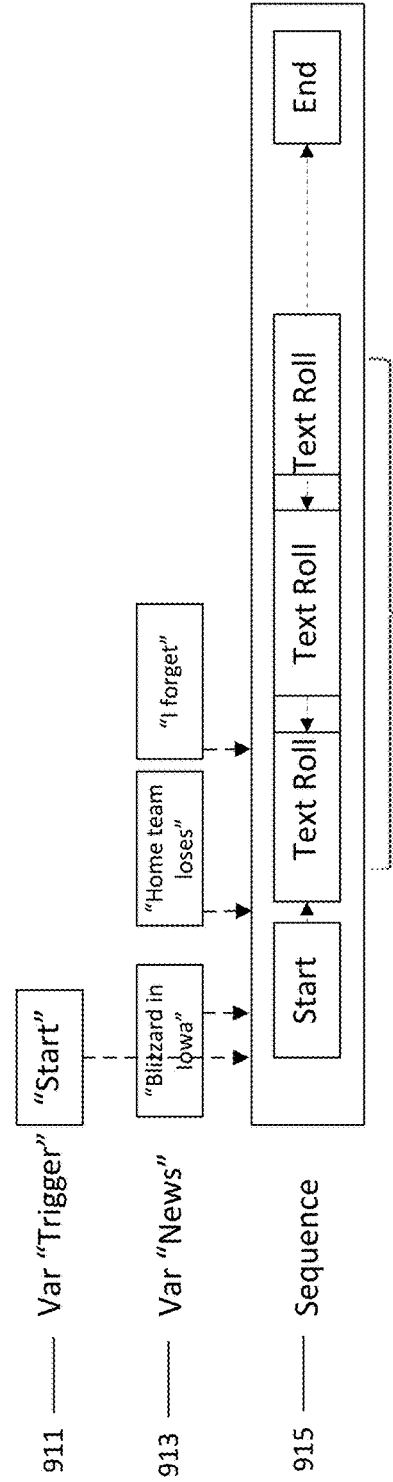
FIG. 9A
FIG. 9B

TEMPLATE BASED TEXT AND GRAPHICS WITH DYNAMIC DURATION

FIELD OF THE INVENTION

The present invention relates generally to an automated animated title sequence mechanism and more particularly to a system and methods for template based text and graphics that can automatically render the animated title sequence where the duration of the sequence must dynamically fit an arbitrary or predetermined timeline.

BACKGROUND

Traditionally, creating animated graphics (title) sequences for live broadcasting versus creating animated graphics sequences for edited media have been completely different endeavors. In live scenarios, the graphic is often composed of a series of animated overlapping sequences which are individually triggered in response to live cues, and play out in real time.

In offline or non-linear editing (NLE) scenarios, the author sets up the graphics and text on a timeline, animates the motion with key frames, and generates a final render. These are significantly different approaches and were historically used for different purposes. For example, the live application typically involves dedicated and expensive hardware, costing $50 k and up, while the non-linear editing scenario may be, for example, a software program that operates on a desktop computer. Not surprisingly, they are completely different systems, and so productions that require running both as a live production and a canned, edited one, require two completely different authoring approaches, two different file formats, and two different products to render them.

It would be advantageous to have one format that can be authored once and then used to both play live titles in response to cue triggers as well as used to generate a finished render in an offline editing scenario.

SUMMARY

Presented in this document is a platform and mechanism for a text and graphics engine that can render an animated title sequence where the duration of the sequence must dynamically fit an arbitrary or predetermined timeline. This mechanism may be implemented and performed using a software or firmware application. It offers this capability through a flexible but consistent mechanism that can easily be used by a wide range of applications with differing requirements. In particular, live streaming and offline editing applications have very different requirements for how they manage a title sequence over time. Yet, they both may benefit when the same media platform and format is used.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 9A illustrates a block diagram for a sequence that repeatedly plays a segment, "Tick", that displays an incrementing clock value;

FIG. 9B illustrates a block diagram sequence for a sequence that plays a series of news feeds via rolling text in the "Text Roll" segment;

DETAILED DESCRIPTION

Figure 1:
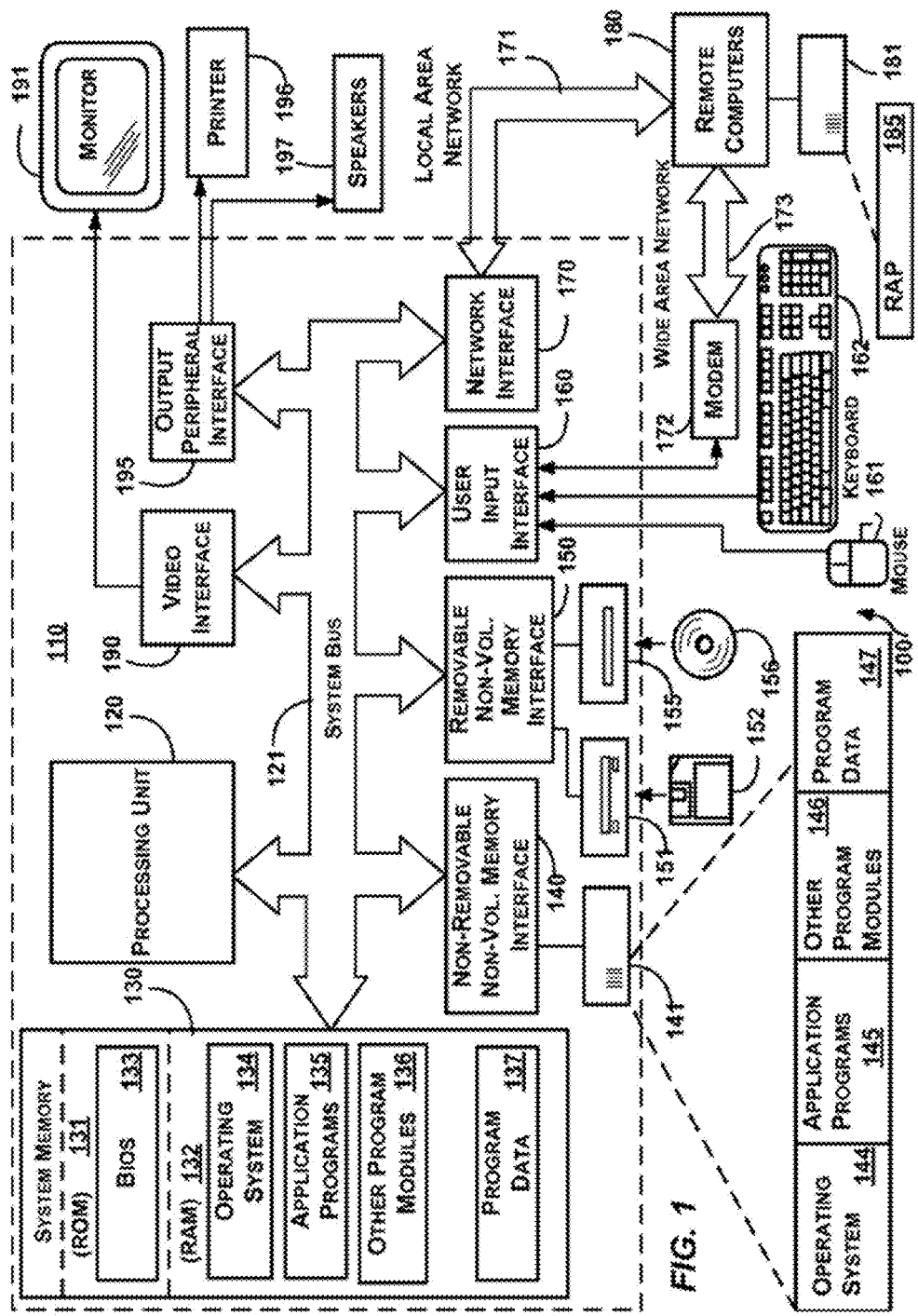
FIG. 1 is a block diagram representing a general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the operating environment 100.

The computing environment 100 may include a system board 110 (alternatively known as the mainboard, motherboard, baseboard, planar board or logic board) which implemented on a printed circuit board (PCB). It provides communication between many of the electronic components of the system operating components, such as a central processing unit (CPU) and memory, and provides connectors for other peripherals. Hardware elements related to the system board 110 include, for example, memory components defined by a system memory using Read Only Memory ROM 131 and Random Access Memory RAM 132 circuitry, a central processing unit CPU 120 being defined by a microprocessing circuit, a system bus 121 having physical wiring bus elements to transfer binary data between each hardware components, and multiple external interfaces including a video interface 190, an output peripheral interface 195, non-removable and removable memory interfaces (140, 150), a user input interface 160, and a network interface 170. External hardware components of the system board 110 may include a display monitor 191, printer 196, speakers 197, keyboard 162, a pointing device or mouse 161, and a local area network 171 interfacing to remote computers 180. Software, programs data, and firmware may be applied to and installed on the system memories (131, 132) and provide instructions to operate the computing system 100. A BIOS 133 for providing a set of computer instructions in firmware that control input and output operations of the computer system 100 may be installed in the ROM 131. Applications related to software include an operating system OS 134, applications programs 135, other program software modules and drivers 136, and program data 137. Software may also be loaded and operated via storage devices such as hard drive 141, disk drive 151 via disk 152, and compact disk drive 155 via compact disk CD 156. The storage device may include and execute software such as an operating system 144, application programs 145, other program modules 146, and program data 147.

Aspects of the subject matter described herein are operational with numerous other general purpose or special purpose computing system environments or configurations.

Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants PDAs, gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The computing system environment 100 may also have or may execute a variety of operating systems OS, including an operating system used on a desktop platform or a mobile operating system used mobile devices such as smartphones, cellular/mobile phone, tablets, personal digital assistance PDA, laptop computer, smart watches, and the like. The computing system environment 100 may also include or may execute a variety of possible applications or "Apps", such as music streamers/players, e-book readers, utility Apps, and electronic gaming apps. The application may provide connectivity and communication with other devices or a server over a network, such as communicating with another computer via a wired or wireless Internet or Intranet network for online interaction such as electronic gaming or online collaboration.

Technology Overview

The mechanisms and elements involved in this technology include:

1. Managing a template as a series of Segments which may be independently rendered and then played back as a series of Render Instances (RI), including
   a. A Segment embedded in template with duration and variable activity information
   b. A Render Instance for representing a rendered segment instance
   c. Render Instance optimization schemes
   d. Segment render to Render Instance process (set variables, rendering)
   e. Create multiple Render Instances for multiple variables
   f. Store and retrieve Render Instances from a cache
2. Sequence Mechanism and elements for Playback Automation, including
   a. Sequence Item to represent a Render Instance in time
   b. Create a sequenced set of Render Instances to match input data and requested duration
   c. Changing data to trigger Render Instance playback
3. Examples of real-time (live) and fixed duration playback Animated Title Sequence Presented in this document is a system for template based text and graphics that can render an animated title sequence where the duration of the sequence must dynamically fit an arbitrary or predetermined timeline. As used and described throughout this document, an animated title sequence is a sequence of motion graphics, composed of individual frames of images, shapes, letters, and any other visual elements, that progressively move, or "animate" from frame to frame, for example to reveal or remove text overlaid on a primary source video.

Demonstration of Managing Title Sequence in Offline Editing Applications Versus Live Scenario Applications In an offline editing scenario, the duration of the title, defined by the total time of the title sequence, is generally known from the start. In this scenario, the text and graphics engine may specify the exact title sequence duration. Alternatively, in a live scenario, the timing is typically driven by a series of cues, driven by real time stimuli, such as for example special keys on a control surface, or a set of cues delivered in sequence over time (Clock Ticks, Start/End triggers, etc.).

Figure 2A:
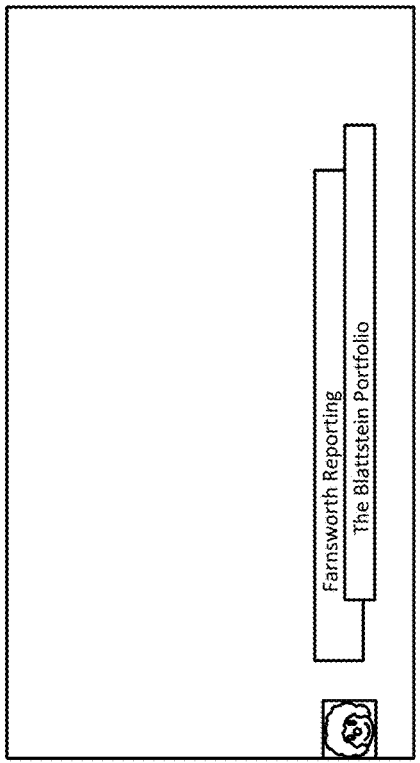
FIG. 2A through FIG. 2G illustrate a simple animated sequences and timing examples of a title as it animates into and out of a series of frames making up a video clip.
Figure 2B:
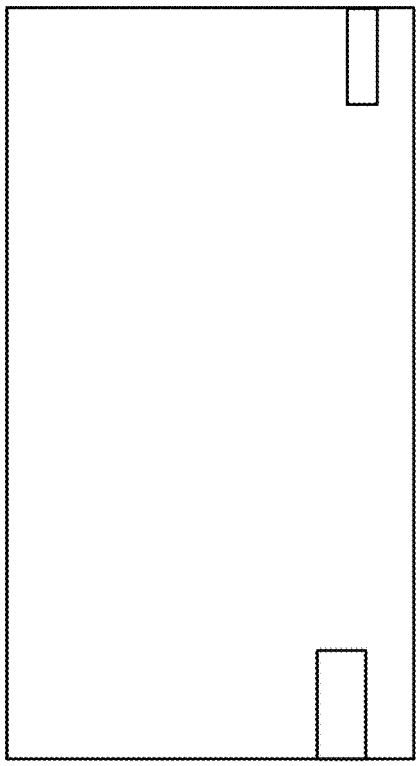
Figure 2C:
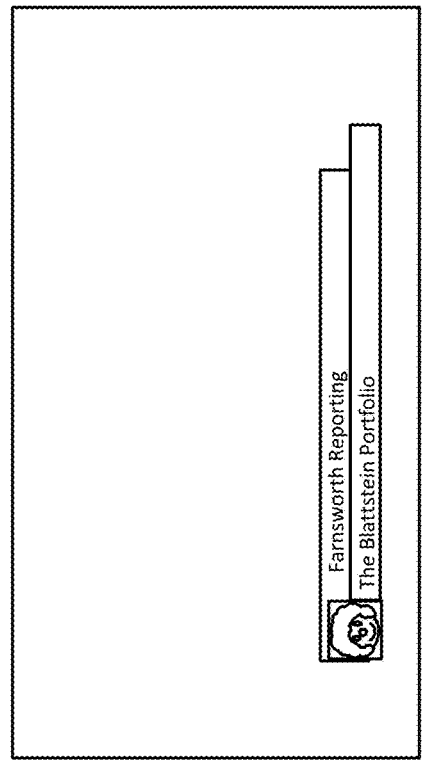
Figure 2D:
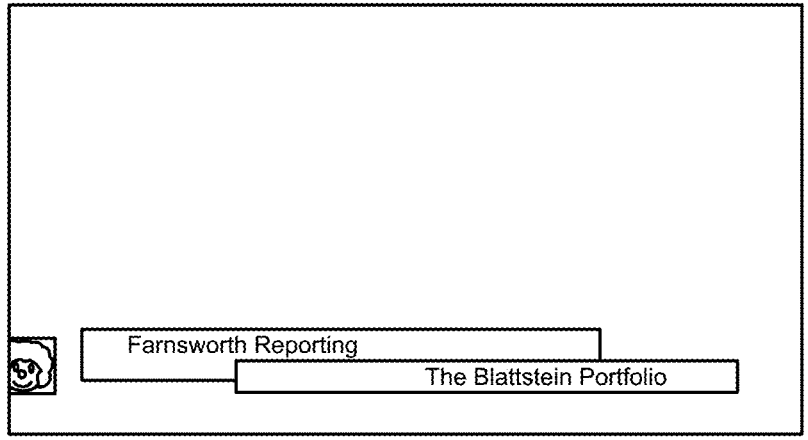
Figure 2E:
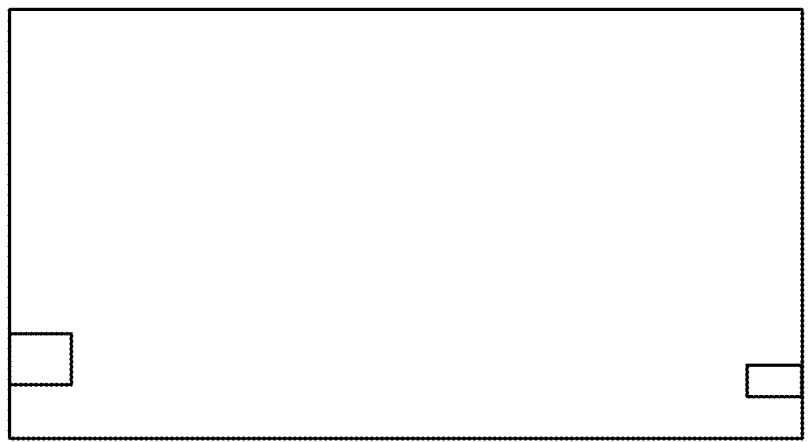

FIG. 2A through FIG. 2G illustrate simple animated sequences and timing examples of a title as it animates into and out of a series of frames making up a video clip. First, the title animates into the video clip starting in FIG. 2A. The title continues its animation in FIG. 2B, which may take 3 seconds in duration and then it holds a while as shown in FIG. 2C. After pausing, the title animates out of the video clip during the last 2 seconds as shown in FIG. 2D and FIG. 2E.

In the offline or Non-Linear Editing (NLE) scenario, the user might request, "make this last 10 seconds" and the software could then create a video clip that starts with the fly in, holds 5 seconds, then runs the fly out, for a total time of exactly 10 seconds.

In the online or Live Streaming scenario, the user might cue, "Start" now, and the streaming software would run the fly in animation, then hold in the middle. Sometime later, the user cues "End" now, triggering the fly out sequence. In this scenario, the total duration is the time between the first and second cues, plus the 2 seconds for the fly out.

Figure 2F:
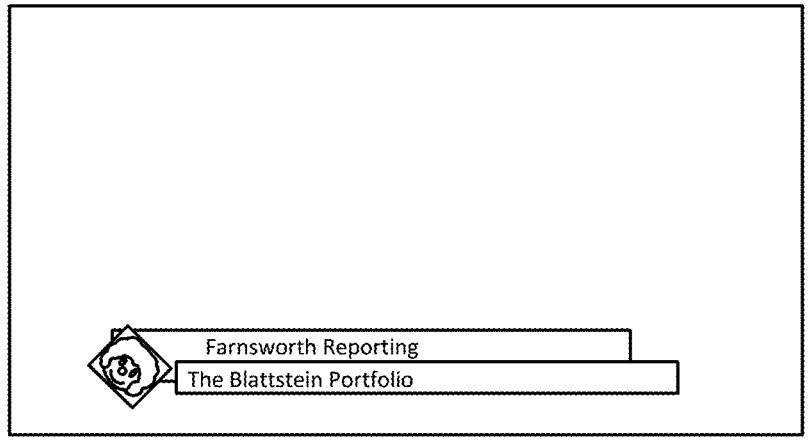
Figure 2G:
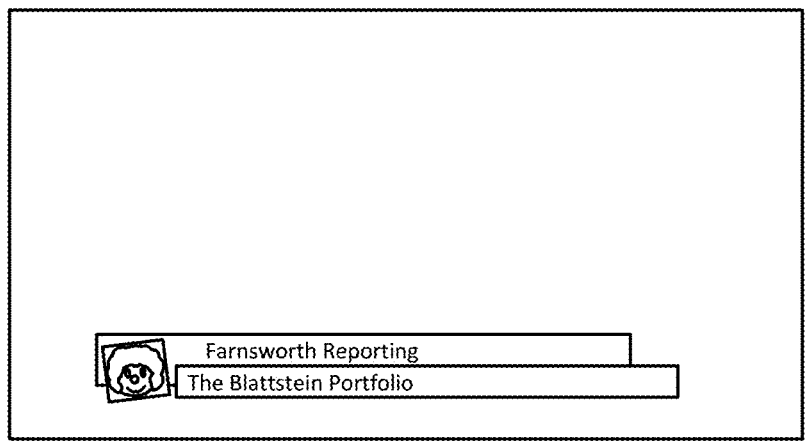

In this example, for both live and offline scenarios, the total duration may be determined by the timing of just two animations. However, more steps and complex animations may be implemented. For example, as shown in FIG. 2F and FIG. 2G, there may be an animated sequence in the middle that rotates the image, triggered periodically to keep the title alive. Other animated sequencing might involve movement that replaces one set of letters with another (e.g., numbers in a countdown timer or sentences in a newsfeed), overlay with a random glint of light, or any conceivable image animation created by the rendering system.

Therefore, it may be useful to break the title down into a series of one or more animations and then combine them over time to create the final video clip output.

Segmentation of the title may be used to achieve the following:

A mechanism for dynamically fitting or scaling a title sequence to meet dynamic or pre-determined timing requirements, both online (live streaming) and offline (non-linear editing).
A single representation for sequence timing that works for both online and offline scenarios.
A single Application Program Interface (API) that is powerful, easy to use in dynamic and static scenarios, and reasonably simple to implement.

Title Template Document Object Organization.

Figure 3:
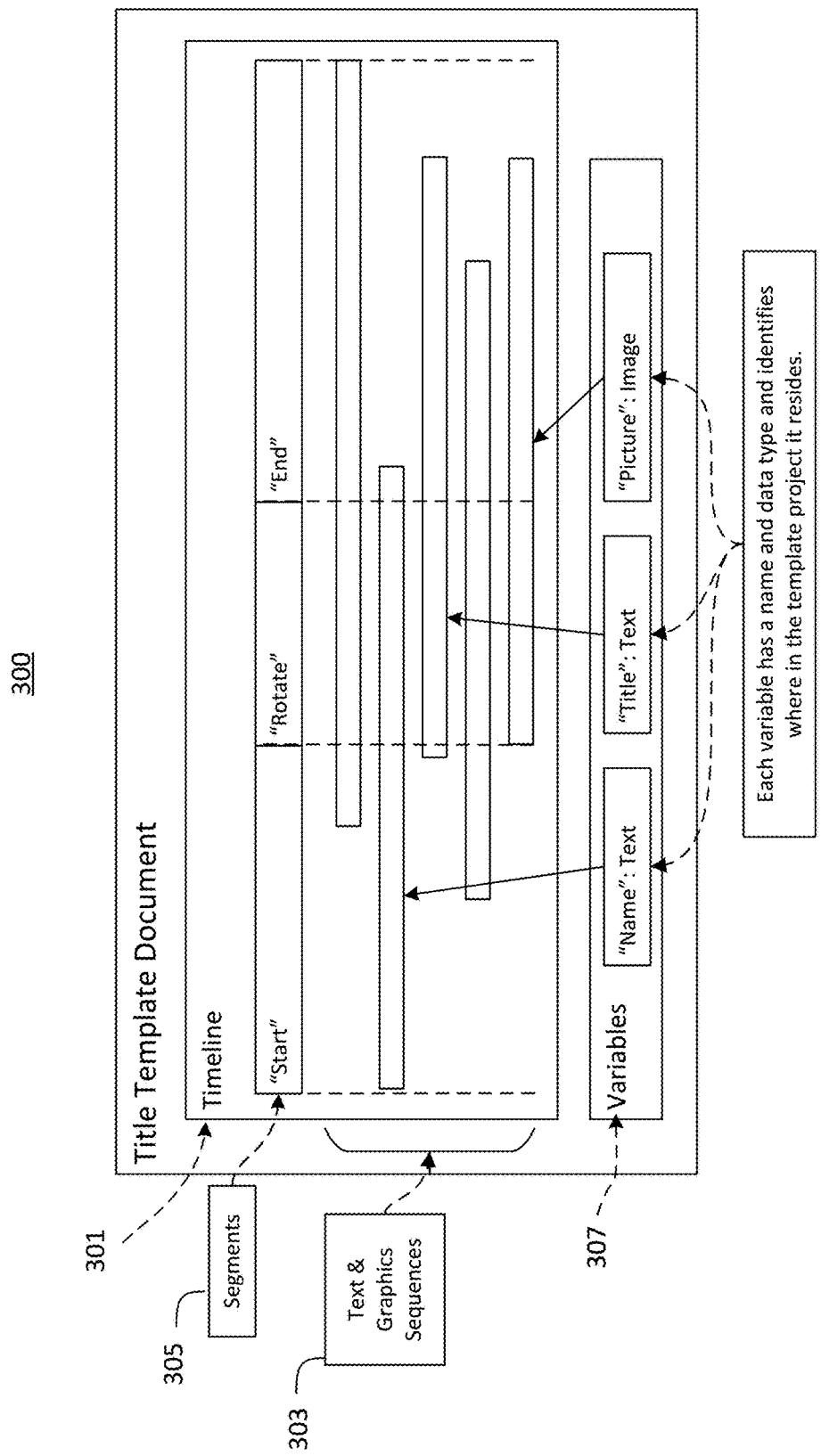
FIG. 3 illustrates a Title Template document defining a title, a template, and containing several text, graphical, and variable elements.

In FIG. 3, one example of a Title Template document 300 defining a title, a template, and containing several text, graphical, and variable elements is presented. In this example, the Title Template document 300 may store a complete description of an animated title sequence. The Title Template document 300 may be composed of a timeline 301, animated text and graphics 303, data and instructions for playback of the animated text and graphics 303 over the course of the timeline 301. In practice, the Title Template document 300 can be implemented in any technology, software, firmware or format, as long as it describes components and elements necessary to render the text and graphics sequence over a linear time.

Along with the timeline 301, the Title Template document 300 includes two sets of information: Segments 305 and Variables 307.

Segments 305 partition the timeline 301 into specific named regions (for example, "Start", "Rotate", "End"). These regions slice the template's timeline 301 into time bounded sections and specify how they can be arranged to create the timeline 301 for a specified duration. Further details of Segments 305 are discussed later in the next section provided herein below.

Variables 307 are elements of the Title Template document 300 that are populated with data, or values. Typically, these are placeholders for text or images, but they can be video clips or other information that can be substituted.

Each Variable 307 may include a name (for example, "Name", "Title", or "Picture") and data type and identifies where in the template project it resides. The name is used to address data to the specific variable 307.

The data type can be anything that might be substituted in the definition of a Template to produce an animated title graphics sequence. Examples of data types include:
Text string;
Image file;
Video file;
Shaped objects (e.g., ellipse, rectangle, star)
Color;
Font;
Geometric values, including scale, rotation, and offset.

If two Variables share the same data type and name, they both may receive the same values simultaneously.

The architecture of the Variables 307 may be extensible so that additional variables may be added later to support complex animated sequences and patterns.

In one example, the Title Template document 300 may include two time oriented variables types: Trigger and Duration.

a) Trigger Variable

The Trigger Variable triggers a segment to play, selecting it by name. Unlike regular variables, which set a current state that can be read multiple times or never at all, Trigger Variables must get used once (preferably at the time they occur) and then reset, not to be repeated until the trigger occurs again.

b) Duration Variable

The Duration Variable is time based and sets how long a full title template should last. In some examples, though, the Duration Variable can be seen as a very simple case of using the Trigger Variables.

Segments

As previously presented, the Segments 305 divide the timeline of the Title Template document 300 into one or more time regions that combine to give the full timeline.

Playback is managed by playing segments, one after each other, with optional pauses between. Typically, the playback steps through the segments in time order, but sometimes it may be useful to repeat a segment or even skip past a segment.

Typically, each segment represents a section of the timeline that responds to a particular trigger, for example "Start", which might fly in, or "End", which would fly out. But there could be occasional triggers that can occur while the title is playing, to keep it active and interesting, for example, a light shimmer that passes over the text intermittently. These triggers can be programmed in to occur in a logical sequence at preset intervals, they can be triggered externally, or they can do both. Thus, segment playback may be structured around key segments that respond to specific triggers.

Figure 4A:
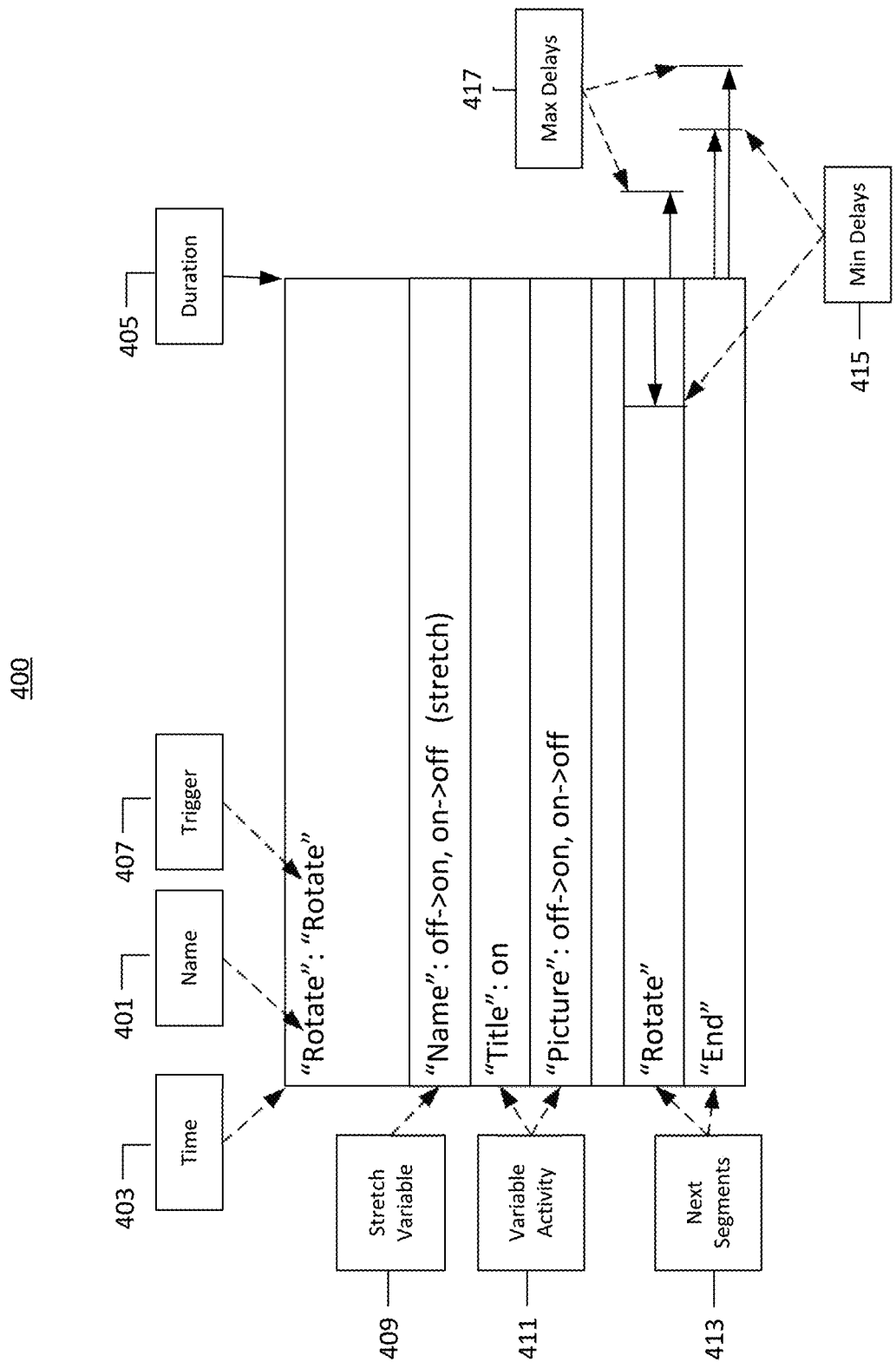
FIG. 4A illustrates elements and structure of a Segment.

In accordance with an embodiment, FIG. 4A illustrates elements and structure of a single Segment 400. Multiple fields composed within the Segment 400 include:

1. Name 401: The Segment 400 has a Name 401 that is used to address it. Typically, the Name 401 relates to the action that triggers it, for example "Start" or "End". But, it can also be more descriptive and specialized, for example, "Light Glimmer" or "Text Crawl".
2. Time 403: The Time 403 is simply the point in time in the timeline in which the segment starts. This time is relative to the start of the template, so the first segment starts with a time 0.
3. Duration 405: The Duration 405 is the exact length of the segment in the timeline. The end of the Duration 405 should match precisely with the start of the next segment, leaving no gaps or overlap.
4. Trigger 407: Optionally, the segment also includes the name of an action that triggers it. In some cases, it may be convenient to use the same name for the Trigger 407 and the segment Name 401, for example, "Rotate" as show in FIG. 4A.
5. Stretch Variable 409: Optionally, one text variable within the Segment 400 may be designated to control and adjust the time duration of the Segment 400. This is primarily used for scrolling text, where the number of characters determines how long the Segment 400 should run.

6. Variable Activity 411: This is a list of all variables, including the Stretch Variable 409, that are active during the Segment 400, with information about each variable's activity, represented as follows:
   a. On→On: The Stretch Variable 409 is visible throughout the Segment 400.
   b. Off→On: The Stretch Variable 409 becomes visible during the Segment 400.
   c. On→Off: The Stretch Variable 409 becomes invisible during the Segment 400.
   d. (Note that for Off→Off, the variable is not listed.)

7. Next Segment 413: This is a set of 0 or more Segments that can follow this Segment. Each Next Segment 413 parameter includes:
   a. Name of the Next Segment 413 (e.g., "Rotate", "End").
   b. Minimum Delays 415. This is the minimum amount of time to wait after this Segment ends before starting the next segment. Note that a negative value allows the two segments to potentially overlap.
   c. Maximum Delays 417. This is the maximum amount of time to wait after this Segment ends before starting the next segment.

In operation, the process of playback of a title is built around playing a series of Segments.

In the simplest case, the process to do so is:
1. Assign values to Variables.
2. Render the Segments.
3. Queue the Segments to play in order from Trigger to Trigger, typically "Start" to "End".

Indeed, for some titles, the above three steps are all that may be necessary. However, playback may be dynamic and often require things to change. For example, the total duration may change or the data that drives the Variables may change during playback.

Thus, in order to maintain the necessary flexibility for complex scenarios, segment playback may be partitioned into the three discrete steps:
1. Assign variables. Set the template variables, potentially with changes at specific points in time.
2. Render a segment. With the variables set, have the title engine generate a series of frames for the segment portion, and store them in a Render Instance.
3. Schedule the segment to play. Queue the Render Instance to play at the appropriate time in a sequence of queued Render Instances.

Figure 4B:
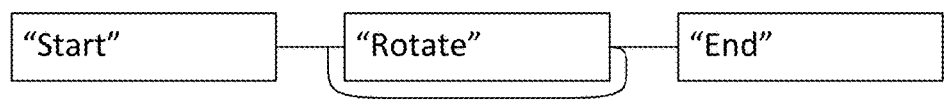
FIG. 4B and FIG. 4C illustrate a Segment connection graph and a Sequenced Segments in a playback timeline, respectively.
Figure 4C:
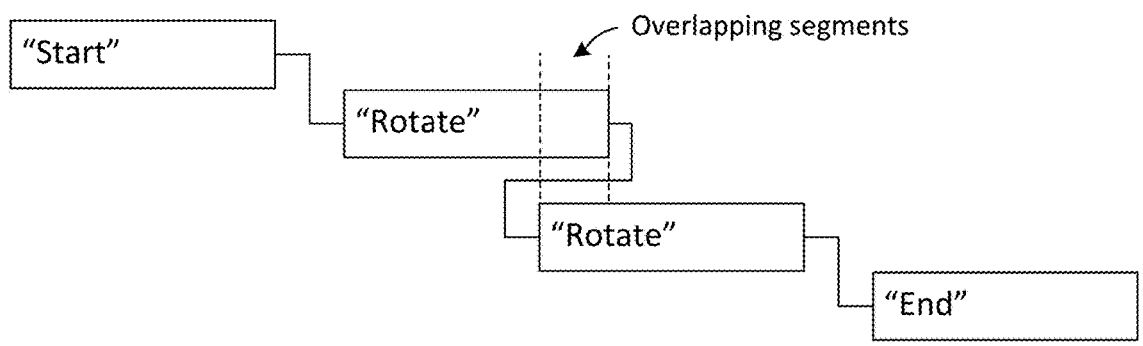

FIGS. 4B and 4C illustrates a simple Segment connection graph and corresponding Sequenced Segments in a playback timeline, respectively.

In FIG. 4B, three segments are defined as "Start", "Rotate" and "End". In this example, the "Start" segment has "Rotate" assigned for next, the "Rotate" segment has "Rotate" and "End" assigned for next, and the "End" segment has nothing assigned for next.

In FIG. 4C, we see an example time-dependent, real-world playout of the simple Segment connection graph, where 1) the "Start" Render Instance plays followed by 2) the "Rotate" Render Instance plays, which is followed by 3) a second "Rotate" plays, which has a negative start offset, causing it to overlap with the end of the first "Rotate", and then subsequently ending with 4) the "End" Render Instance plays.

Segment Render Instance Object

Figure 5A:
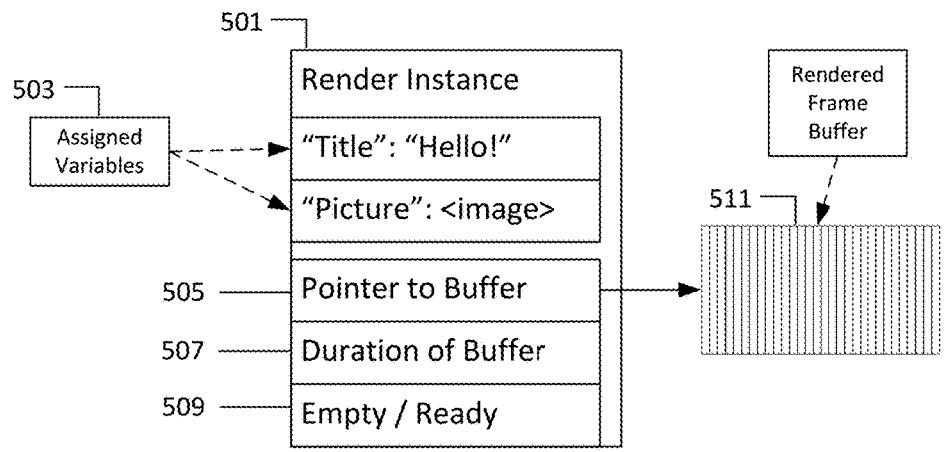
FIG. 5A illustrates a block diagram of a Render Instance of the Segment for a specific combination of variable values.

A Render Instance (RI) mechanism for representing a rendered segment instance is presented in FIG. 5A. For example, in FIG. 5A, a Render Instance 501 represents a realized (or "rendered") instance of the Segment 400 for a specific combination of variable values. Typically, the Segment 400 gets rendered with just one set of values for the variables, resulting in exactly one Render Instance 501. However, if there is a variable that changes frequently or repeats specific values, it can be advantageous to prepare pre-rendered Render Instances for each permutation of the values, resulting in multiple Rendered Instances.

At time of creation, the Render Instance may immediately receive the rendered frames, or delay for rendering later, prior to playback. The render state or status may be indicated by an "Empty" vs "Ready" indicator, or simply the existence of the rendered frames.

The Render Instance 501 may include Assigned Variables 503 having values assigned to it for rendering, Buffer 505, Duration 507, "Empty" vs "Ready" indicator 509, and link to Rendered Frames 511 and Rendered Frame Buffer 513.

In practice, for example, a time clock could be pre-rendered with 60 different time values. This would involve creating 60 Render Instances and assigning each a unique time value.

If a text variable in the Segment 400 is identified as the "Stretch" Variable 409, then the text characters within it are used to modify the total Duration 405. It does so by adding a constant duration value for each additional letter added to the text string. A more sophisticated approach also adjusts for font width.

Segments Render Process

Figure 5B:
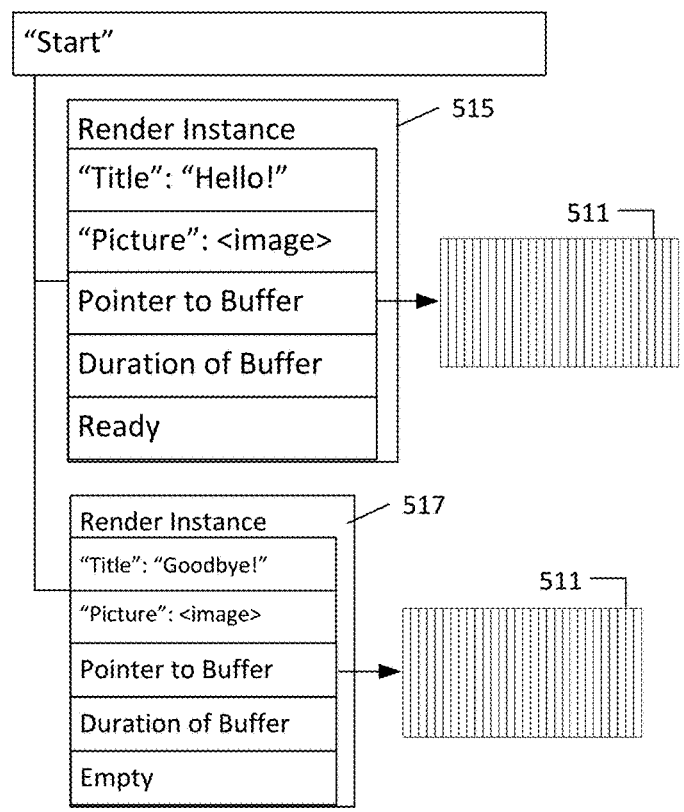
FIG. 5B illustrates a block diagram of a Segment with two Render Instance variations.

FIG. 5B illustrates a simple example of a Segment with two Render Instance variations (515, 517). The process of rendering the Segment 400 is the process of generating one or more Render Instances, each for a different combination of variable values. In practice, the Segment Render process may include the following steps:
1. Retrieve the variable values
2. Keep the values that are a member of the set listed by the segment
3. Apply the values to the template
4. For each combination of values:
   a. Look for an existing Render Instance by checking for the value combination
   b. If the Render Instance does not exist, create it
      i. Store the variable values and segment information in the Render Instance.
      ii. Optionally, render all the frames for the Render Instance.
      iii. Otherwise, mark the Render Instance "Empty".
      iv. Save in the segment's Render Instance list.

Figure 6A:
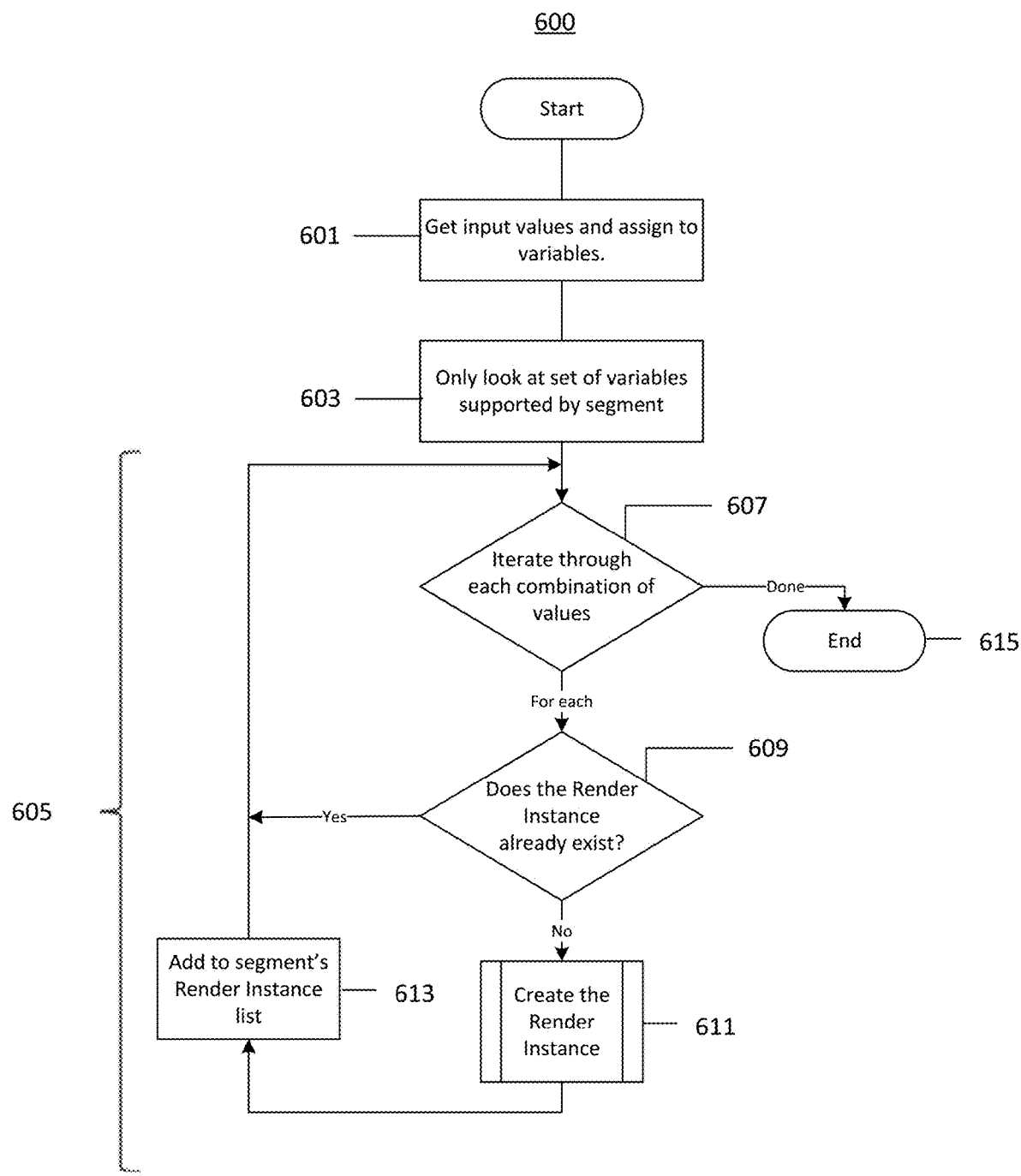
FIG. 6A Illustrates a Segment rendering flowchart.

FIG. 6A Illustrates a Segment Render Instance preparation flowchart 600 as described above.

Each Segment variable can have one or more values assigned to it. For example, a countdown clock has different values to represent every second. Typically, only one value for a variable is available at a time, but over the course of the title's playback timeline, a variable can change multiple times, sometimes repeating or even overlapping itself. With that in mind, Render Instances for all these permutations of the Segment are eventually necessary, and so it can be useful to prepare one or more at once.

At step 601, a set of input values are retrieved for each of the variables in the Segment.

Next, at step 603, limit to just the variables active within the Segment 400. These values from step 603 are sent to an iterative loop 605 to process each variable value combination. In the iterative loop 605, the Segment rendering mechanism iterates through each combination of values at step 607. For each combination of values, the Segment rendering mechanism searches for an existing Render Instance by checking for each value combination at step 609. If the Render Instance does not exist, the Segment rendering mechanism creates it at step 611. The created Render Instance is then saved in the Segment's Render Instance list at step 613. Once all value combinations have been iterated, step 607, then all necessary Render Instances are now created or exist, and the process is complete at step 615.

Figure 6B:
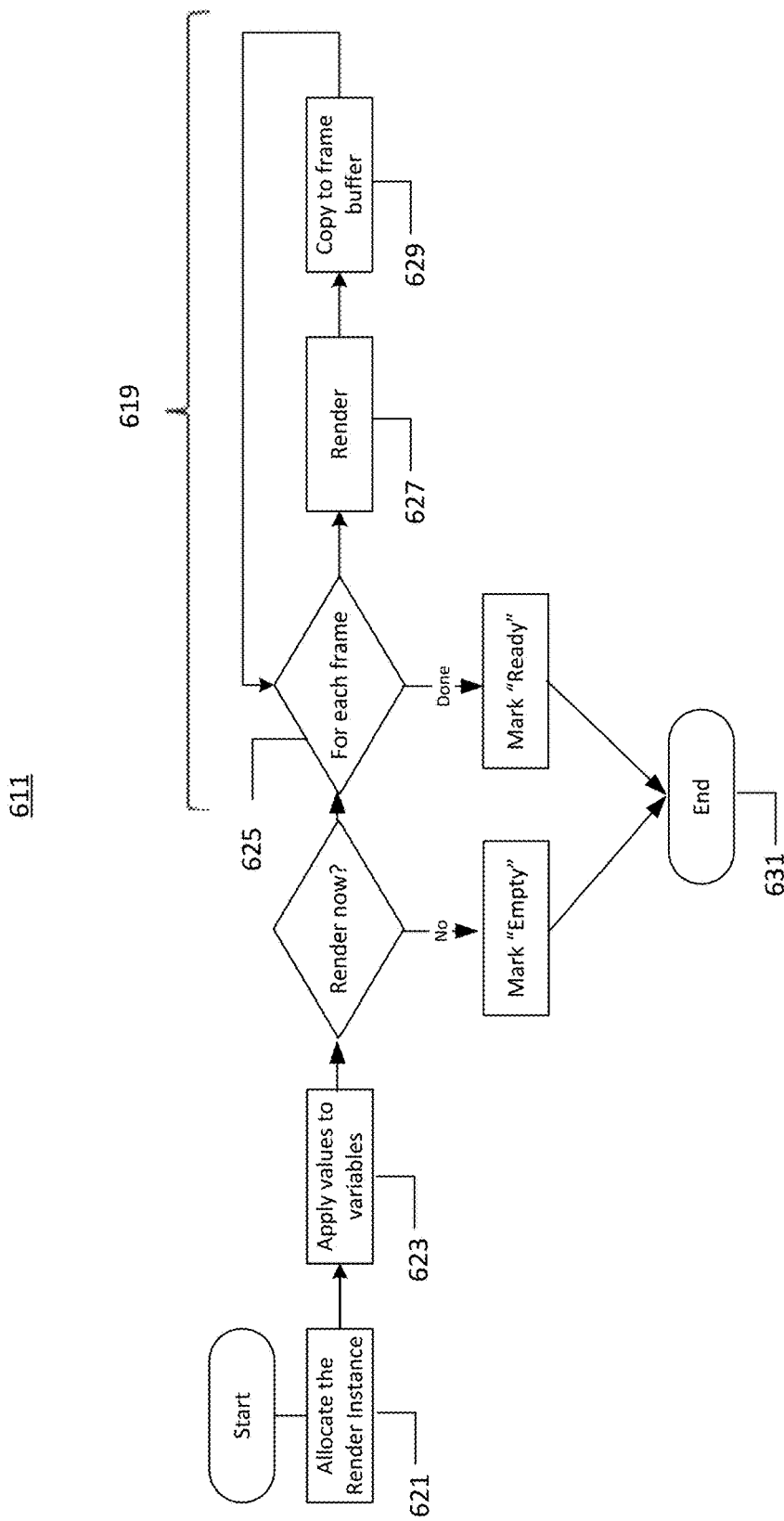
FIG. 6B illustrates a process flowchart for creating the Render Instance.

The process flowchart for creating the Render Instance 611 and creating multiple Render Instances for multiple variables are further illustrated in FIG. 6B. Creating the Render Instance 611 begins at step 621, allocating the Render Instance 611. Values are applied to the Render instance 611 at step 623. Then, if rendering is not requested yet, the Render Instance 611 is marked "empty" and placed in the list of Render Instances. Otherwise, each frame of resulting Render Instance 611 from step 623 is fed into an iterative loop 619 for rendering 627 and storing 629 into the frame buffer 511 until the Render Instance 611 is completed at step 631 and placed in the list of Render Instances.

Sequencing Segment Render Instances

Figure 7A:
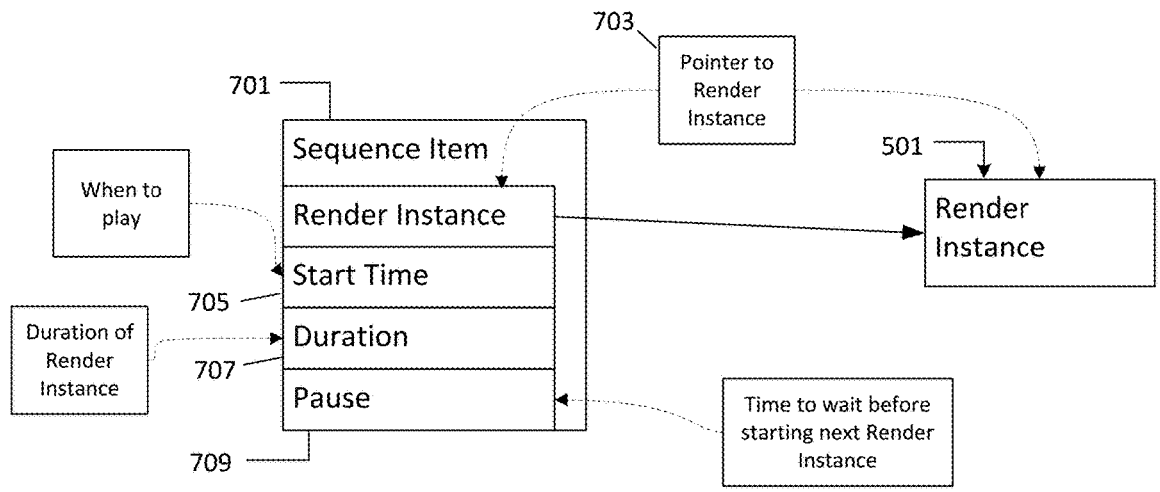
FIG. 7A and FIG. 7B illustrate a Sequence Item and a list of queued segment Render Instances called a Sequence, respectively.
Figure 7B:
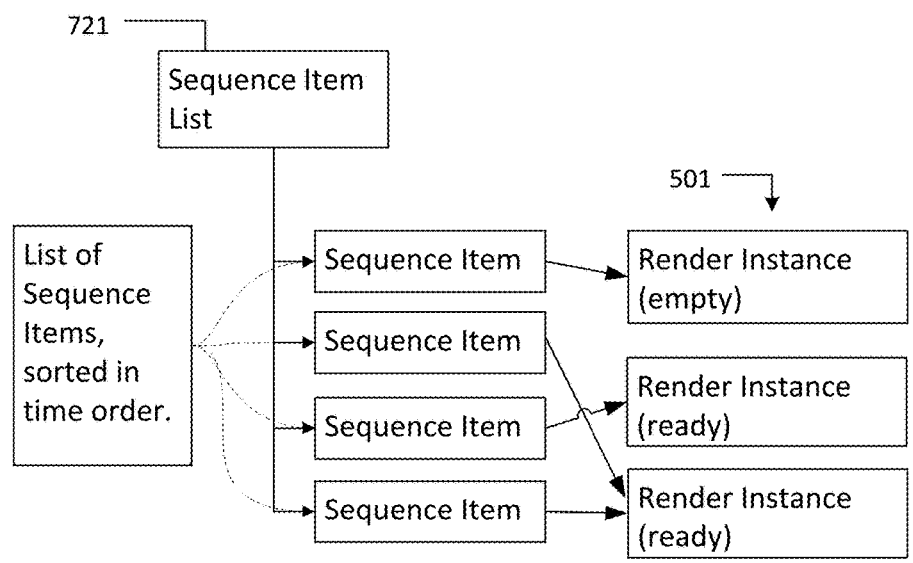

Once segment Render Instances have been created, the Render Instances can be queued for playback in yet another embodiment. FIG. 7A and FIG. 7B illustrate a Sequence Item 701 and a list of queued segment Render Instances called a Sequence 721, respectively. Note that if a Render Instance does not yet have its frames rendered (marked "empty"), it can still be placed in the playback list. In this case, playback requires an intermediary stage of rendering before playing. In some implementations, this render is "real time" and occurs immediately before or even during playback. In others, it is a discrete step that must occur first.

For purposes of clarity, it is important to remember that each Render Instance represents:

1. A reference matching of a Segment with Variables.
2. An indication whether the frame buffer has been created.
3. The frame buffer itself (if it has been created).

The Sequence Item 701 in FIG. 7A described herein includes a pointer 703 to the Render Instance 501, a Start Time 705 of when to play, a Duration 707 of the Render Instance 501, and a Pause Time 709 to wait before starting the next Render Instance.

Once the Sequence Item List 721 (or "Sequence") is constructed and sorted in time order, playing it back is simply a process of queuing the Render Instances to play at the specific times as specified in the Sequence Items, as shown in FIG. 7B.

The difficult part in this process is building the Sequence list 721 via a Sequence Builder. Depending on whether the performance is live or fixed (i.e., known duration for a title in an NLE), the sequence builder may have very different requirements for constructing the Sequence list 721. Yet, another objective is to make the system and file format easily portable between live and fixed applications.

FIG. 8A, FIG. 8B, FIG. 9A, and FIG. 9B represent four different design scenarios for templates with differing variable and animation requirements that must work consistently in both live and offline implementations.

Figure 8A:
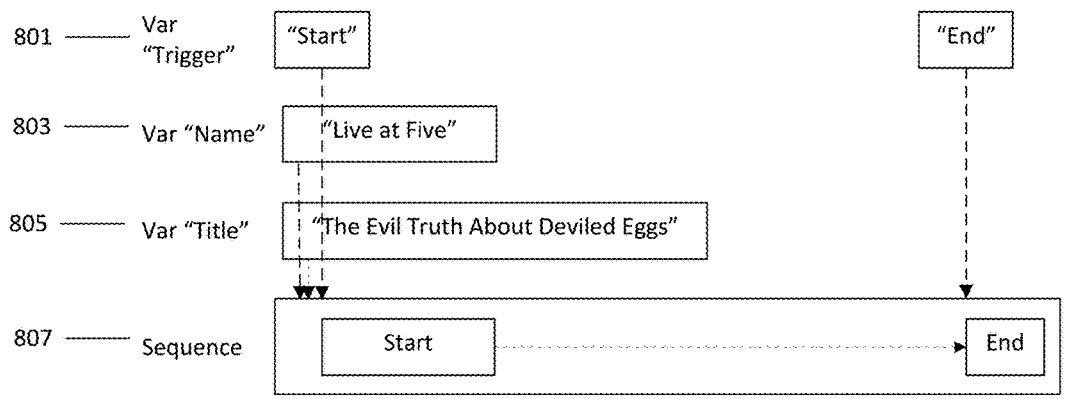
FIG. 8A illustrates a block diagram for a simple sequence that plays a segment, "Start", that displays multiple text lines, then holds until the segment "End", which fades them out.

FIG. 8A illustrates a simple graphics sequence 807 for a simple lower thirds display overlay. The desired behavior is as follows: 1) Fill in the name and title parameters (803, 805), 2) then display it 3) pause, and then end it. The variable "Trigger" 801 defined in this graphic sequence includes a trigger named "Start" and trigger named "End". Upon triggering, the "Start" Trigger variable initiates a display action at the Start Segment of the graphic sequence block 807, and the "End" Trigger animates it back out at the End segment.

Figure 8B:
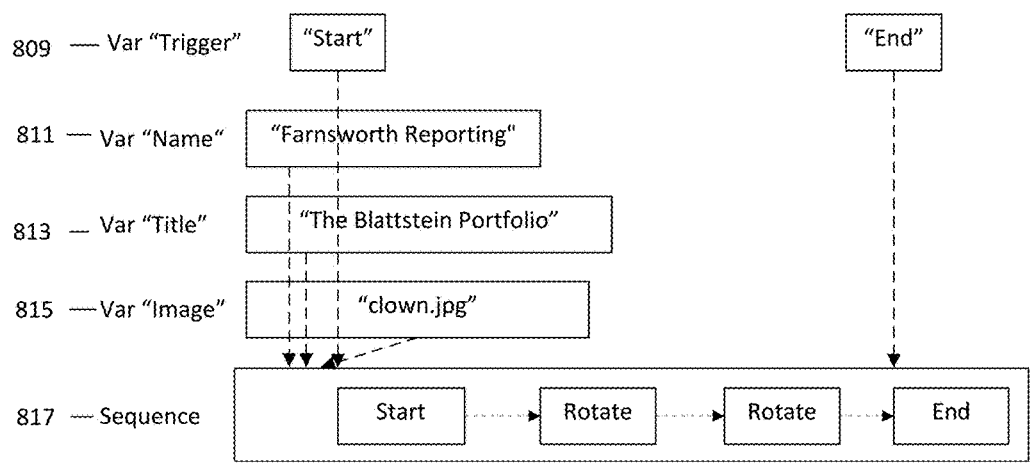
FIG. 8B illustrates a block diagram for a simple sequence that plays a segment, "Start", then plays an intermittent segment, "Rotate", which rotates the letters, until it reaches the segment "End", which fades them out.

FIG. 8B illustrates a slight enhancement of the simple graphics sequence of FIG. 8A. Once the lower third overlay is displayed, it automatically executes a simple animation 815, for example, the "clown.jpg", at a regular interval to keep viewers engaged. Thus, the desired behavior in this example is 1) Fill in the name and title parameters (811, 813), 2) then display it 3) pause, and then end it. The variable named "Trigger" 809 includes trigger variables named "Start" and "End". As shown in the Sequence 817 block, the "Start" Trigger variable initiates a display action at the Start segment. After a pause, the Rotate segment automatically plays. Next, it pauses and again plays the Rotate segment. Eventually, an "End" Trigger animates it back out. In this example, note that the Start and Rotate segments set Min Delays to Rotate that are shorter than the Min Delay to End, so the arrival of an "End" trigger causes the End Segment to play before another Rotate can be queued.

FIG. 9A illustrates an example of another graphics sequence that displays a countdown clock as part of a scoreboard. The desired behavior in this countdown clock example is as follows: 1) Send a start command to display, 2) then a series of clock ticks, and 3) then an end command.

The implementation for this graphics sequence is as follows: The "Start" trigger variable defined by "Trigger" 901 triggers the "Start" segment that causes the graphics to animate in, drawing the current score, named "Score" 903 and initial clock value, named "Clock" 905. Then, after every second, an updated clock time in the "Clock" variable 905 triggers the playback of the Tick segment 909 as shown in the Sequence 915 block. The Tick segment 909 animates from the current clock value to the new clock value and holds. This continues every second with the arrival of a new "Clock" variable 905 until an "End" trigger variable causes the End segment to play, finishing the sequence. With respect to delays, the Start and Tick segments set Min Delays to Tick that are longer in duration than to End, so the arrival of an "End" trigger causes the End Segment to play before another Tick can be queued.

FIG. 9B illustrates yet another graphics sequence 915 that plays a series of news feeds via rolling text in the Text Roll segment. The desired behavior is as follows: 1) Send the first news feed and the start command; 2) continue to send additional news feeds as soon as they are ready; 3) once the last news feed finishes playing, and there are no more, end the sequence.

The implementation of this series of news feeds graphic sequence is as follows: Once again, the "Start" Trigger variable defined by variable named "Trigger" 911 initiates display. Each time a "News" variable 913 introduces a new message, a new Text Roll segment 917 Render Instance is prepared and then sequenced to play slightly overlapping with the prior one. Once the last Text Roll 917 plays, if nothing new appears before the Min duration to link to the End segment, then the End segment is queued up to finish playback. In the graphic sequence block 915, the Start and Text Roll segments set Min Delays to Text Roll segments that are shorter than the Max Delay to End, so they keep playing until there is nothing and then the End segment is the only choice.

Referring again to the Sequence Builder, in certain embodiments, the Sequence Builder may construct a sequence list for playback in either a live scenario or a fixed duration scenario. Inputs to the Sequence Builder may include, for example, the segments from a template file and the time stamped variables, including triggers, which arrive either in real time (for a live performance) or as a predetermined time duration known from the start (for example, as in a fixed render in an editing scenario), and generates the appropriate Render Instances.

For a live performance, the objective is to choose the correct segments to play, one by one, in response to live variable activity including live triggers. Alternatively, for a fixed performance, the objective is to choose the full list of correct segments to play in sequence and make sure they fit a fixed or predetermined duration, while also accommodating a list of variable activity that occur during that time span at fixed points in time. In both cases, the representation of the list of segments to play is in the form of a Sequence list of Render Instances.

Next, the general operation of the Sequence Builder is presented.

In the sequencing segment, two requirements for establishing the order of the segments may include:
1. Determining which variables change at which times during playback.
2. Determining what is the overall duration requirement for the series of segments.

A mechanism to determine what to play next is focused around two key processes:
1. First, setting up the triggers, such as "Start" and "End", which determine the time framework for playback.
2. Next, sequence segments by selecting segments that transition between trigger states. The mechanism to perform this operation is embodied by a function named GetNextSegment( ) called when a segment has finished to determine what segment to play next.

Optionally, the system may override the function GetNextSegment( ) with its own algorithm. Typically, this is implemented via a firmware or software script such as, for example, Java, JavaScript, C++, C#, Python, and PHP.

The function GetNextSegment( ) may receive three parameters:
1. pFirstSegment, the segment to start with.
2. pLastSegment, the trigger segment to end with, or NULL if there is no trigger segment to end on.
3. fTimeRemaining, the amount of time left to get through that last segment.

In operation, GetNextSegment( ) returns the segment to play next as well when to play it. Two applications and use of GetNextSegment( ) are provided herein below and in FIG. 10 and FIG. 11—the first for creating the sequence items for a live performance driven by cue points, and the second for creating sequence items for an offline performance with a fixed duration, respectively.

Figure 10:
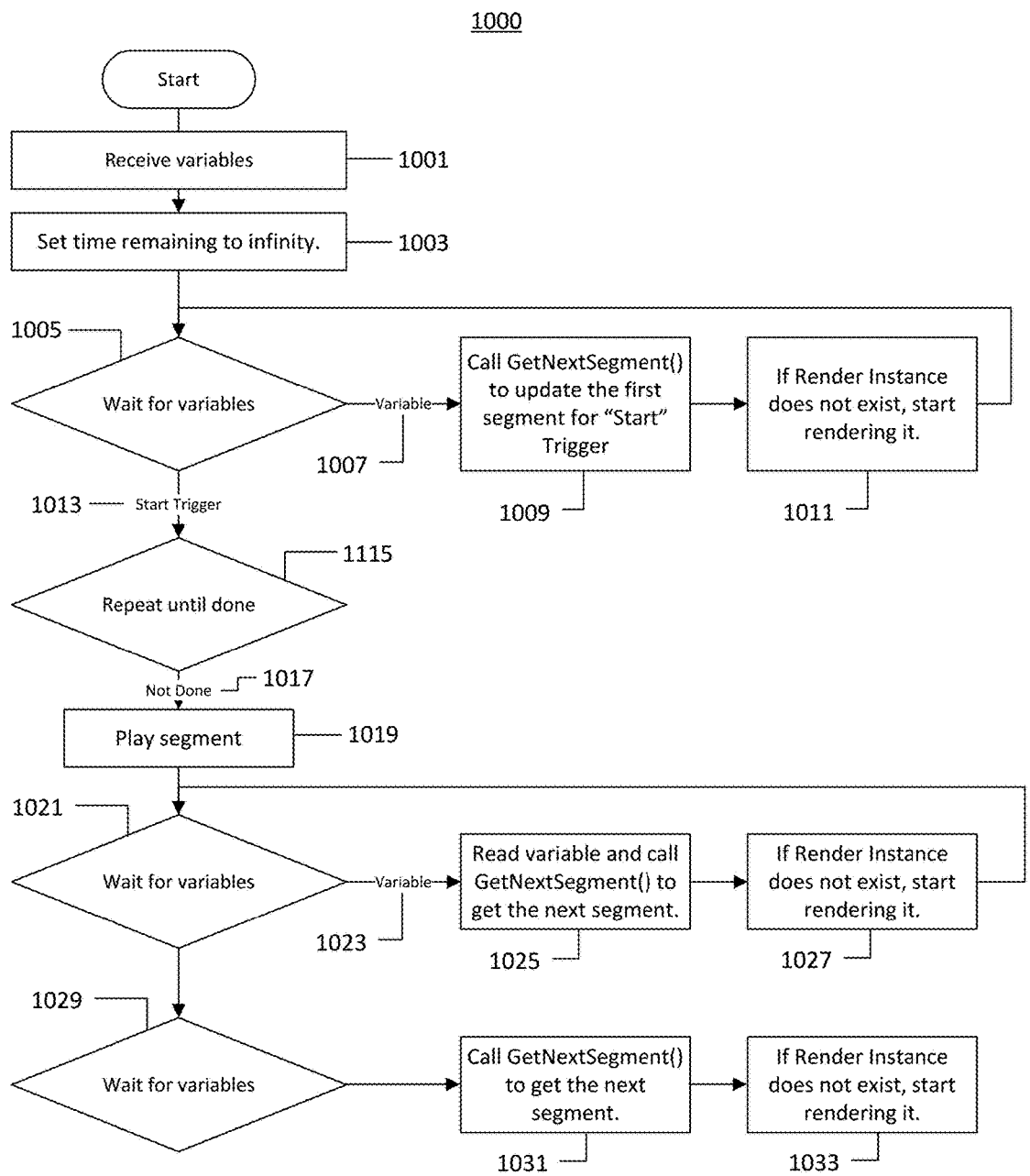
FIG. 10 illustrates a flowchart of sequencing segments using the GetNextSegment( ) function for a live performance.

FIG. 10 illustrates a flowchart 1000 of sequencing segments using the GetNextSegment( ) for a live performance. When called in the live performance, fTimeRemaining is usually a very high number, since the total duration is unknown. The steps for calculating the timing and placement of segments for a live performance are as follows.
1. Receive variables 1001.
2. Set time remaining to infinity 1003.
3. Wait for the "Start" Trigger variable 1005.
4. While waiting for variables:
   a. Every time there is a variable change 1007, call GetNextSegment( ) 1009 to get the first segment to play in response to the upcoming "Start" trigger 1013.
   b. If the necessary Render Instance does not exist, create it 1011.
5. Then, repeat until done 1015.
6. Check Not Done 1017. When Not Done 1017:
   a. Play the segment 1019.
   b. While segment is playing:
      i. Wait and Check for new variables 1021.
      ii. When a variable changes 1023, read variable and call GetNextSegment( ) to get the next segment 1025.
         1. If new segment, create Render Instance, if doesn't exist, and start it rendering 1027.
   c. On completion of the playing if there is no next segment 1029, call GetNextSegment( ) to get the next segment 1031.
   d. Now, set to wait until the next segment by the min duration from the assigned Render Instance.
   e. While waiting to play next segment:
      i. When a variable changes, call GetNextSegment( ) to get the next segment.
         1. If new segment, start Render Instance render, if doesn't exist 1033.
      ii. If a Trigger variable changed, break out of the wait so the new segment can be played immediately (because this is a trigger.)
      iii. If min duration timed out, break out of the wait to play the next segment.

Figure 11:
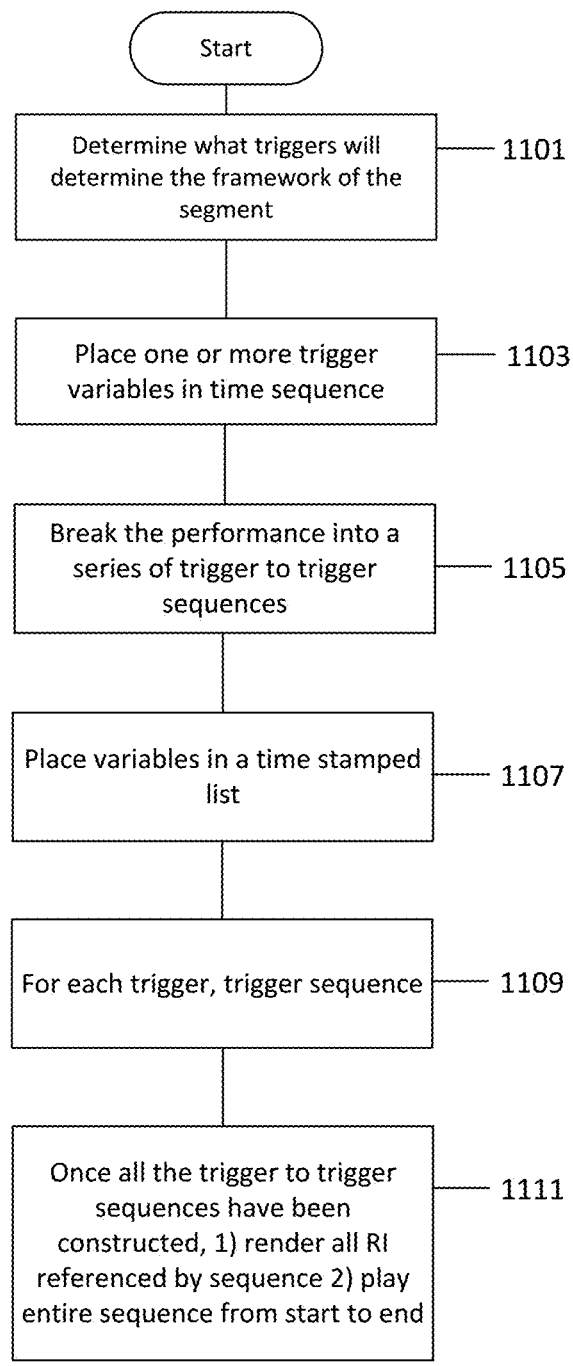
FIG. 11 illustrates a flowchart of sequencing segments using the GetNextSegment( ) function for a fixed duration performance.

FIG. 11 illustrates a flowchart of sequencing segments using the GetNextSegment( ) for a fixed duration performance. The steps described in detail below.
1. Determine what triggers will determine the framework of the segment 1101. These include:
   a. "Start" only. These titles have no variability in duration. They simply play through until done. (End segment is NULL.)
   b. "Start" and "End" triggers. These are the most commonplace—segments that fly in, display something, then fly out. The "Start" trigger brings the title into view and the "End" trigger takes it back out.
   c. "Start" and "End" with some intermediate triggers, for example "Rotate".
2. Place one or more trigger variables in time sequence 1103.
   a. For the generic case of using a timed duration for the title, create a "Start" trigger at time 0 and "End" variable at time (requested duration—end segment duration).
3. Break the performance into a series of trigger to trigger sequences (i.e., "Start" to "End") 1105.
4. Put variables in a time stamped list (in case some change during playback) 1107. Include the trigger variables.
5. For each trigger to trigger sequence 1109 (going between a first and second trigger segment)
   a. Select the first segment, using the first trigger name.
   b. Set remaining time for this sequence to second trigger time minus first segment duration.
   c. While remaining time>0:
      i. Call GetNextSegment( ) to get the next segment.
      ii. If the duration of the segment is greater than the remaining time, break out of the loop.
      iii. Otherwise, add the segment to the sequence.
      iv. Increment the time by the minimum duration of the segment.
   d. Now, finish constructing segments as Render Instances and placing in sequence, via Sequence Items.

e. Next, scale the sequence to match the requested duration.
f. If there are two or more segments in the sequence, calculate additional time to insert between segments as follows:
  i. Calculate remaining time.
  ii. Divide the remaining time by the number of segments, minus one.
  iii. Add this additional time to the gap between each segment in the sequence.
6. Once all the trigger to trigger sequences have been constructed 1111,
  a. Render into all the Render Instances referenced by the sequence.
  b. Play the entire sequence from start to end, using the time stamps in each Sequence Item to place the Render Instance on the correct point in the time line.

GetNextSegment( ) Function

The GetNextSegment( ) function implements the mechanism for stringing segments in sequence for the Sequence Builder as shown in Table 4. Examples of three supporting functions that are used in the GetNextSegment( ) function are provided in Tables 1-3.

Table 1 represents a pseudo-code of a Getvariable Value( ) function, describing a callback function into the sequencer to retrieve the value that a particular variable is expected to hold at a specific point in time (i.e., relative to the start of the sequence). The callback function is necessary because variables can change over time and sometimes a variable can change the length of a segment, which may influence the total playback duration.

TABLE 1

```
/* Return value for the requested variable at the given time */
char *GetVariableValue(
    double fTime,              // Time since start of sequence.
    char *pVariableName);      // Variable to check.
```

Table 2 is a pseudo-code of a GetSegmentDuration( ) function which finds the duration of the given segment. This function handles the fact that the segment may have a variable duration if input variables have caused it to change. The steps performed by the GetSegmentDuration( ) function include:
1. For every variable that the segment uses (always including the Trigger (Segment) variables):
   a. Call GetVariableValue( ) to get the value of the variable at the given time.
2. Scan through the list of Render Instances for the segment:
   a. If a Render Instance is found which matches the variable values, return its duration.
3. If no Render Instance found, return the duration of the segment itself.

In certain embodiments, the ability for scripts inside titles may be added to set the duration of individual segments. For example, current scripting mechanism may be provided and used for features like crawls. In some implementations, a new script routine may be added to alter the template/segment duration.

TABLE 2

```
/*Find the duration of the given segment. The segment may have a
variable duration if input variables have changed it. This searches for
the Render Instance variation of the segment that matches the variable
```

TABLE 2-continued

```
values at the requested point in time.*/
double *GetSegmentDuration(
    Segment *pSegment,                    // Segment to check.
    (char *)GetVariableValue(double, char *),  // Callback to get variable
                                          // values.
    double fTime);                        // Point in time since start.
```

In Table 3 represents a pseudo-code of a VerifyEnoughTime( ) function. In operation, this function receives a segment to start with, a segment to end with, and how much time remains in order to complete through the end of that last segment. This function determines if there is enough time left to play this segment as well as the ones that follow it through to the end of the segment list. The function returns TRUE if there is enough time or FALSE if there is not enough.

To avoid a recursive infinite loop, each segment internally tracks its recursion with a variable to ensure it does not go over a reasonable time limit. This ensures that if the function VerifyEnoughTime( ) ends up calling itself, it prevents it from calling itself too many times. The steps performed by the VerifyEnoughTime( ) function include:
1. Subtract the segment's duration from fTimeRemaining.
2. If fTimeRemaining becomes less than 0, return FALSE.
3. If pFirstSegment and pLastSegment are the same (we've reached the end of the list), return TRUE.
4. Incremenet pFirstSegment's recursion counter. If it hits the max limit for recursion, return FALSE.
5. Iterate through the list of next segments starting with the latest start time (closest to end of template.)
6. For each (pNextSegment):
   a. Get the minimum delay to go to pNextSegment.
   b. Recursively call VerifyEnoughTime(pNextSegment, pLastSegment, fTimeRemaining−minimum delay).
   c. If VerifyEnoughTime( ) succeeds, decrement pFirstSegment's recursion counter and return TRUE.
   d. Else, continue with the next segment in the list.
7. No path was found. Increment pFirstSegment's recursion counter and return FALSE.

TABLE 3

```
/*Determine if there is enough time left to play the first through last
segment.Return TRUE or FALSE.*/
bool VerifyEnoughTime(
    Segment *pFirstSegment,               // Segment to start
                                          // with.
    Segment *pLastSegment,                // Segment to end with.
    (char *)GetVariableValue(double, char *),  // Callback to get
                                          // variable values.
    double fTimeRemaining);               // Time remaining to
                                          // traverse from
                                          // start of first
                                          // segment to end of
                                          // last.
```

Table 4 describes pseudo-code for the GetNextSegment( ) function. The GetNextSegment( ) function receives a segment to start with and a segment to end at and how much time remains to get through the end of that last segment. Using these, it determines which segment to play next.

The GetNextSegment( ) function finds the potentially longest path through the segment list and returns the first segment to play after the current one.

Note the special case of pLastSegment=NULL, which simply means play through the end of the template.
1. If pFirstSegment is NULL, simply return the very first segment in the title.

2. If pLastSegment is NULL, set it to the last segment in the title.
3. Subtract the segment's duration from fTimeRemaining.
4. If fTimeRemaining becomes less than 0, return FALSE.
5. Iterate through the list of next segments starting with the earliest start time.
6. For each:
   a. Call VerifyEnoughTime( ) with the segment and fTimeRemaining−minimum delay.
   b. If VerifyEnoughTime( ) succeeds, return a pointer to the segment and the time to play it. Calculate the time as the min delay added to the end of the first segment's duration.
   c. Else, continue with the next segment in the list.
7. If it falls through, return NULL, indicating there's not enough time.

TABLE 4

```
/* Determine which segment to play next. Given a starting and ending
segment and time span, find the potentially longest path through the
segment list and return the first segment in that sequence and the time
at which to play it. */
Segment * GetNextSegment(
    Segment *pFirstSegment,        // Segment to start with.
    Segment *pLastSegment,         // Segment to end with.
    (char *)GetVariableValue(double, char *),   // Callback to get
variable values.
    double fTimeRemaining,         // Time remaining to traverse from
                                   // start of first segment to end
                                   of last.
    double *pfStartTime);          // Point in time to play the segment.
```

Figure 12:
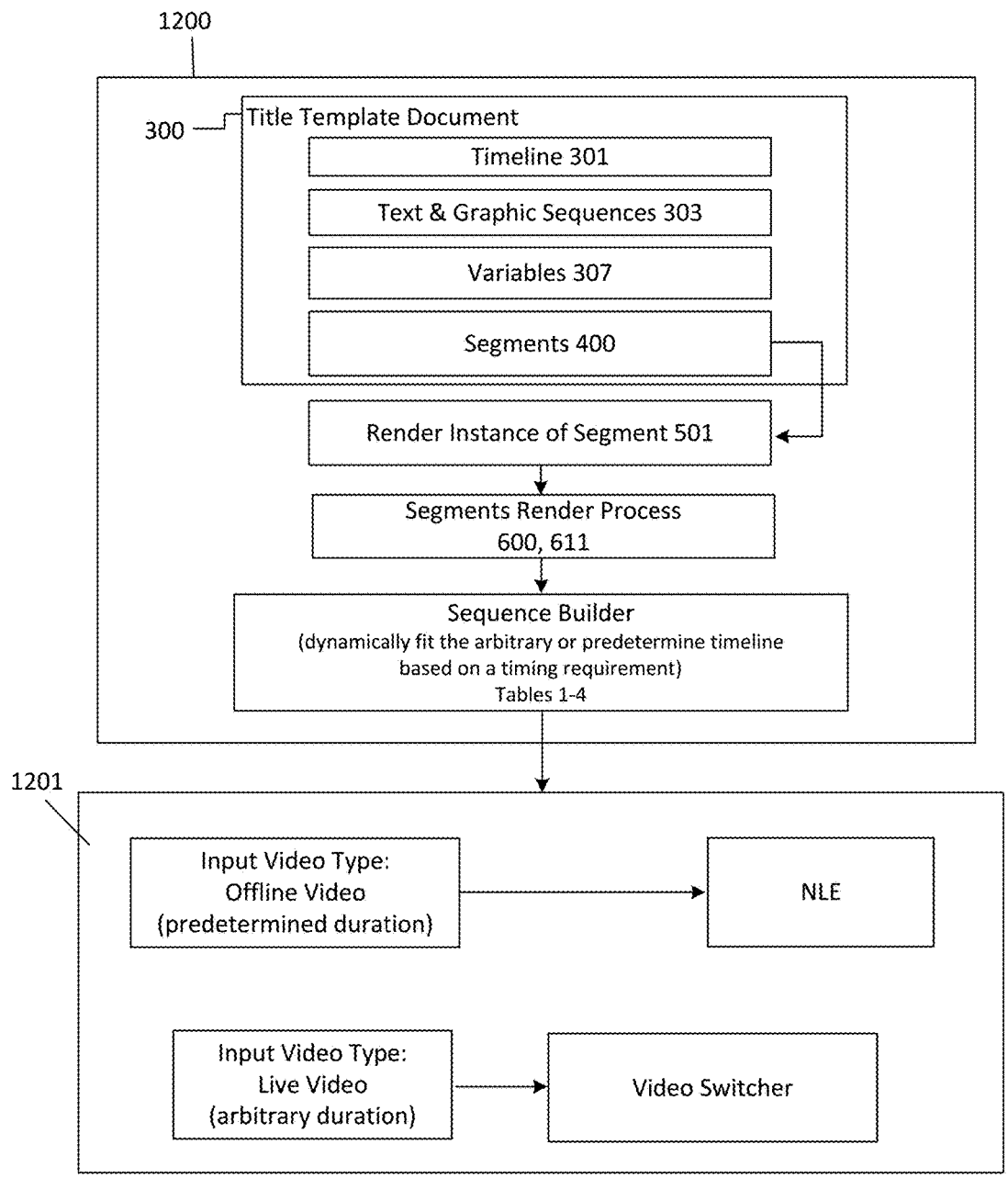
FIG. 12 illustrates a block diagram of the system for the template based text and graphics with dynamic duration.

FIG. 12 illustrates a block diagram of the system for template based text and graphics with dynamic duration 1200. The system 1200 includes a Text and Graphics Engine for storing, generating, and building an animated title sequence to dynamically fit the arbitrary or predetermine timeline based on a timing requirement. In practice, the timing requirement may represent an arbitrary duration associated with a real-time video or a predetermined duration associated with a pre-recorded video. The rendered output of the animated title sequence generated by the Text and Graphics Engine may be transmitted to a video destination output 1201 for processing and playback. For example, the video destination output 1201 for playback may include a variety of formats that is compatible for viewing on a variety of devices for preview (pre-recorded) or live monitoring. Some of these configurations and formats include, for example, HDMI protocols and video switchers for live monitoring and MPEG-4 for pre-recorded videos.

All patents, patent applications, and other references cited herein are incorporated by reference in their entireties.

What has been described and illustrated herein are several aspects of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. A computer implemented method comprising:
   storing a title template in a memory component, wherein the title template includes a timeline, a plurality of text and graphical elements sequentially place over the timeline, and a plurality of variables;
   defining one or more segments in the timeline, wherein each segment plays in response to a trigger;
   generating a plurality of render instance objects for each segment, wherein each render instance object is stored in a render instance list;
   assembling the plurality of render instance objects in a sequence to dynamically build and adjust a rendered animated title sequence based on a timing requirement, wherein the sequence includes a list of sequence items referencing one or more render instance objects defined in the render instance list;
   transmitting the rendered animated title sequence to a video destination output for playback;
   retrieving a plurality of variable values from the memory component, wherein each variable value has a combination of values;
   storing in the memory component the plurality of variable values that are associated with the one or more segments, wherein each segment is defined by a segment information;
   applying the plurality of variable values to the title template;
   iterating through each combination of values;
   searching for an existing render instance object;
   creating a new render instance object if the existing render instance object does not already exist;
   storing the plurality of variable values and the segment information in the new render instance object; and
   storing the new render instance object in a segment list of render instances.

2. A computer implemented method comprising:
   storing a title template in a memory component, wherein the title template includes a timeline, a plurality of text and graphical elements sequentially place over the timeline, and a plurality of variables;
   defining one or more segments in the timeline, wherein each segment plays in response to a trigger;
   generating a plurality of render instance objects for each segment, wherein each render instance object is stored in a render instance list;
   assembling the plurality of render instance objects in a sequence to dynamically build and adjust a rendered animated title sequence based on a timing requirement, wherein the sequence includes a list of sequence items referencing one or more render instance objects defined in the render instance list;
   transmitting the rendered animated title sequence to a video destination output for playback;
   receiving a plurality of variable associated with the title template;
   setting a time remaining value to infinity;
   waiting for a start trigger variable;
   iterating through a sequence building function while waiting for each variable associated with the title template; and
   playing each render instance object in response to the sequence building function.

3. A computer implemented method comprising:
storing a title template in a memory component, wherein the title template includes a timeline, a plurality of text and graphical elements sequentially place over the timeline, and a plurality of variables;
defining one or more segments in the timeline, wherein each segment plays in response to a trigger;
generating a plurality of render instance objects for each segment, wherein each render instance object is stored in a render instance list;
assembling the plurality of render instance objects in a sequence to dynamically build and adjust a rendered animated title sequence based on a timing requirement, wherein the sequence includes a list of sequence items referencing one or more render instance objects defined in the render instance list;
transmitting the rendered animated title sequence to a video destination output for playback;
determining one or more trigger variables associated with the title template;
placing the one or more trigger variables in a time sequence on the timeline, wherein the one or more trigger variables are stored in a time stamped list;
separating each segment into a sequence of trigger-to-trigger sequence items, wherein each render instance object is referenced by a unique trigger sequence item; and
iterating through a sequence building function for each sequence of trigger-to-trigger sequence items to produce a final sequence of render instances to play.

* * * * *